United States Patent
Catania et al.

(10) Patent No.: US 10,402,849 B2
(45) Date of Patent: *Sep. 3, 2019

(54) DIGITAL INCENTIVES ISSUANCE, REDEMPTION, AND REIMBURSEMENT

(75) Inventors: William M. Catania, Erie, PA (US); Michael J. Kavis, Parristi, FL (US); Gregory H. Rapp, Largo, FL (US)

(73) Assignee: INMAR CLEARING, INC., Winston-Salem, NC (US)

( * ) Notice: Subject to any disclaimer, the term of this patent is extended or adjusted under 35 U.S.C. 154(b) by 568 days.

This patent is subject to a terminal disclaimer.

(21) Appl. No.: 12/783,666

(22) Filed: May 20, 2010

(65) Prior Publication Data

US 2010/0299266 A1 Nov. 25, 2010

Related U.S. Application Data

(60) Provisional application No. 61/179,964, filed on May 20, 2009.

(51) Int. Cl.
*G06Q 30/02* (2012.01)
*G06Q 20/38* (2012.01)

(52) U.S. Cl.
CPC ..... *G06Q 30/0238* (2013.01); *G06Q 20/3829* (2013.01); *G06Q 30/02* (2013.01); *G06Q 30/0211* (2013.01); *G06Q 30/0236* (2013.01)

(58) Field of Classification Search
CPC .................................................. G06Q 30/02
See application file for complete search history.

(56) References Cited

U.S. PATENT DOCUMENTS

| 4,882,675 A | 11/1989 | Nichtberger et al. ......... 364/401 |
| 4,949,256 A | 8/1990 | Humble |

(Continued)

FOREIGN PATENT DOCUMENTS

| GB | PCT/GB2006/003441 | 9/2006 |
| GB | 2 430 297 A | 3/2007 |

(Continued)

OTHER PUBLICATIONS

M-Dot Network Creates A Secure Transaction Network for Digital Coupons, Reuters., Sep. 24, 2009. http://www.reuters.com/article/2009/09/24/idUS175012+24-Sep-2009+PRN20090924.

(Continued)

*Primary Examiner* — Vincent M Cao
(74) *Attorney, Agent, or Firm* — Allen, Dyer, Doppelt + Gilchrist, P.A., Attorneys at Law

(57) ABSTRACT

A system and method for issuance, redemption, and reimbursement of digital incentives. A central database connected to the internet: enables customers to register unique customer registration information; is able to store this information and assign unique identifiers to it; and is accessible to incentives providers to make available digital incentives. Existing point-of-sale terminals: are authenticated to have access to the central database; have payment devices; are connected to the internet; and are provided with a message broker that facilitates communication with the central database. The customer redeems digital incentives at one of the existing point-of-sale terminals at the time of purchase by first presenting their unique identifier. The message broker routes the unique identifier to the central database which authenticates and validates the existing point-of-sale terminal, the customer's unique identifier, and the payment device. The central database then returns validated applicable digital incentives to the message broker which forwards the validated digital incentives for redemption.

14 Claims, 4 Drawing Sheets

(56) References Cited

U.S. PATENT DOCUMENTS

| | | | |
|---|---|---|---|
| 5,053,957 A | 10/1991 | Suzuki | 364/405 |
| 5,403,752 A | 4/1995 | Bruchhaus | |
| 5,537,314 A | 7/1996 | Kanter | 364/406 |
| 5,924,080 A | 7/1999 | Johnson | 705/26 |
| 6,009,411 A | 12/1999 | Kepecs | 705/14 |
| 6,035,280 A | 3/2000 | Christensen | |
| 6,041,309 A | 3/2000 | Laor | 705/14 |
| 6,298,329 B1 | 10/2001 | Walker | |
| 6,321,208 B1 | 11/2001 | Barnett et al. | 705/14 |
| 6,484,146 B2 | 11/2002 | Day et al. | 705/14 |
| 6,497,360 B1 | 12/2002 | Schulze, Jr. | |
| 6,505,773 B1 | 1/2003 | Palmer | |
| 6,516,302 B1 | 2/2003 | Deaton | |
| 6,766,301 B1 | 7/2004 | Daniel | |
| 6,775,539 B2 | 8/2004 | Deshpande | 455/14.4 |
| 6,889,198 B2 | 5/2005 | Kawan | |
| 6,915,271 B1 | 7/2005 | Meyer | |
| 6,937,665 B1 | 8/2005 | Vandenameele | |
| 6,937,995 B1 | 8/2005 | Kepecs | |
| 6,968,180 B2 | 11/2005 | Kirby | |
| 7,013,286 B1 | 3/2006 | Aggarwal | |
| 7,016,860 B2 | 3/2006 | Modani | |
| 7,055,031 B2 | 5/2006 | Platt | |
| 7,139,793 B2 | 11/2006 | Lala et al. | 709/203 |
| 7,188,763 B2 | 3/2007 | Lee | |
| 7,228,285 B2 | 6/2007 | Hull | |
| 7,257,545 B1 | 8/2007 | Hung | 705/14 |
| 7,308,254 B1 | 12/2007 | Rissanen | 455/414.1 |
| 7,318,041 B2 | 1/2008 | Walker | |
| 7,343,317 B2 | 3/2008 | Jokinen et al. | 705/14 |
| 7,398,225 B2 | 7/2008 | Voltmer | |
| 7,428,498 B2 | 9/2008 | Voltmer | |
| 7,451,177 B1 | 11/2008 | Johnson et al. | 709/203 |
| 7,463,898 B2 | 12/2008 | Bayne | 455/466 |
| 7,599,857 B2 * | 10/2009 | Bishop et al. | 705/50 |
| 2001/0002486 A1 * | 5/2001 | Kocher et al. | 713/171 |
| 2002/0010623 A1 | 1/2002 | McCollom | |
| 2002/0010627 A1 | 1/2002 | Lerat | |
| 2002/0026348 A1 | 2/2002 | Fowler | |
| 2002/0065716 A1 | 5/2002 | Kuschill | |
| 2002/0107738 A1 * | 8/2002 | Beach et al. | 705/14 |
| 2002/0120496 A1 | 8/2002 | Scroggie et al. | 705/14 |
| 2002/0124170 A1 * | 9/2002 | Johnson, Jr. | 713/176 |
| 2002/0128903 A1 | 9/2002 | Kernahan | 705/14 |
| 2002/0138348 A1 | 9/2002 | Narayan | |
| 2002/0143612 A1 * | 10/2002 | Barik et al. | 705/14 |
| 2002/0147636 A1 | 10/2002 | Modani | |
| 2002/0161643 A1 | 10/2002 | Tai | |
| 2003/0036950 A1 | 2/2003 | Nguyen | 705/14 |
| 2003/0050831 A1 | 3/2003 | Klayh | 705/14 |
| 2003/0055727 A1 * | 3/2003 | Walker et al. | 705/14 |
| 2003/0125977 A1 * | 7/2003 | Morioka et al. | 705/1 |
| 2003/0130889 A1 * | 7/2003 | Fravel | 705/14 |
| 2003/0135414 A1 | 7/2003 | Tai | |
| 2003/0158818 A1 | 8/2003 | George et al. | 705/64 |
| 2003/0208684 A1 * | 11/2003 | Camacho et al. | 713/186 |
| 2003/0216967 A1 | 11/2003 | Williams | |
| 2003/0220834 A1 * | 11/2003 | Leung et al. | 705/14 |
| 2003/0229540 A1 * | 12/2003 | Algiene | 705/14 |
| 2003/0233276 A1 | 12/2003 | Pearlman | |
| 2004/0107135 A1 | 6/2004 | Deatherage | |
| 2004/0117261 A1 | 6/2004 | Walker et al. | 705/14 |
| 2004/0128197 A1 | 7/2004 | Bam et al. | 705/14 |
| 2004/0210484 A1 | 10/2004 | Lee | |
| 2004/0210771 A1 * | 10/2004 | Wood et al. | 713/201 |
| 2004/0249712 A1 | 12/2004 | Brown | |
| 2005/0010773 A1 * | 1/2005 | Lapstun | B41J 2/17503 713/170 |
| 2005/0015300 A1 | 1/2005 | Smith | |
| 2005/0033643 A1 | 2/2005 | Smith | |
| 2005/0131761 A1 | 6/2005 | Trika et al. | 705/14 |
| 2005/0171845 A1 * | 8/2005 | Halfman et al. | 705/14 |
| 2005/0173517 A1 | 8/2005 | Suk et al. | |
| 2005/0234771 A1 | 10/2005 | Register | |
| 2006/0089878 A1 | 4/2006 | Roberts | |
| 2006/0100931 A1 | 5/2006 | Deaton et al. | 705/15 |
| 2006/0149627 A1 | 7/2006 | Brown | |
| 2006/0224449 A1 * | 10/2006 | Byerley | G06Q 30/06 705/14.27 |
| 2006/0265281 A1 | 11/2006 | Sprovieri | |
| 2007/0022007 A1 | 1/2007 | Lawe | |
| 2007/0083433 A1 | 4/2007 | Lawe | |
| 2007/0094080 A1 * | 4/2007 | Wiken | 705/14 |
| 2007/0150339 A1 | 6/2007 | Retter et al. | 705/14 |
| 2007/0152038 A1 | 7/2007 | Ciancio | |
| 2007/0156517 A1 | 7/2007 | Kaplan et al. | 705/14 |
| 2007/0174115 A1 | 7/2007 | Chieu | |
| 2007/0228157 A1 * | 10/2007 | Eckert | 235/380 |
| 2007/0260509 A1 | 11/2007 | Hines | |
| 2007/0276727 A1 | 11/2007 | Thibedeau | |
| 2007/0288313 A1 | 12/2007 | Brodson et al. | |
| 2008/0010114 A1 | 1/2008 | Head | |
| 2008/0010131 A1 | 1/2008 | Bridges et al. | 705/14 |
| 2008/0065490 A1 | 3/2008 | Novick et al. | 705/14 |
| 2008/0086770 A1 * | 4/2008 | Kulkarni | H04L 63/0876 726/20 |
| 2008/0097844 A1 | 4/2008 | Hsu et al. | 705/14 |
| 2008/0097855 A1 | 4/2008 | Rissanen | |
| 2008/0097857 A1 | 4/2008 | Walker | |
| 2008/0103909 A1 | 5/2008 | Huang | |
| 2008/0183571 A1 | 7/2008 | Aaron | 705/14 |
| 2008/0228567 A1 | 9/2008 | Williams et al. | 705/14 |
| 2008/0243623 A1 | 10/2008 | Redford et al. | |
| 2008/0255954 A1 | 10/2008 | Leung | |
| 2008/0262928 A1 * | 10/2008 | Michaelis | 705/14 |
| 2008/0267500 A1 | 10/2008 | Keswani | |
| 2008/0300970 A1 | 12/2008 | Scheibe | 705/14 |
| 2008/0319846 A1 * | 12/2008 | Leming et al. | 705/14 |
| 2009/0006203 A1 * | 1/2009 | Fordyce et al. | 705/14 |
| 2009/0018908 A1 | 1/2009 | Dersovitz | 705/14 |
| 2009/0030789 A1 | 1/2009 | Mashinsky | |
| 2009/0036103 A1 | 2/2009 | Byerley et al. | 455/414.1 |
| 2009/0099929 A1 | 4/2009 | Thibedeau et al. | 705/14 |
| 2009/0106115 A1 * | 4/2009 | James et al. | 705/14 |
| 2009/0144164 A1 | 6/2009 | Wane | |
| 2009/0171793 A1 | 7/2009 | Gersovitz | |
| 2009/0254930 A1 | 10/2009 | Lo | |
| 2009/0271272 A1 | 10/2009 | Berkowitz | |
| 2009/0287558 A1 | 11/2009 | Seth | |
| 2010/0250351 A1 * | 9/2010 | Gillenson et al. | 705/14.13 |

FOREIGN PATENT DOCUMENTS

| | | |
|---|---|---|
| GB | 2 430 297 B | 9/2008 |
| WO | WO 97/21200 | 6/1997 |
| WO | WO 00/39657 | 7/2000 |
| WO | WO 01/50392 A2 | 7/2001 |
| WO | WO 01/77856 A1 | 10/2001 |
| WO | WO 2006/059124 A1 | 6/2006 |
| WO | WO 2006/084247 A2 | 8/2006 |
| WO | PCT/US2007/088687 | 12/2007 |
| WO | WO 2008/083115 A1 | 7/2008 |
| WO | WO 2008/143984 A1 | 11/2008 |

OTHER PUBLICATIONS

Information about Related Patents and Patent Applications, see the section of the accompanying Information Disclosure Statement Letter entitled "Related Patents and Patent Applications" for further information.

Regarding related patents and patent applications, see the section of the accompanying IDS letter entitled, "Related Patents and Patent Applications".

* cited by examiner

DIGITAL INCENTIVES ISSUANCE, REDEMPTION, AND REIMBURSEMENT

This application claims the benefit of U.S. Provisional Application No. 61/179,964 filed on May 20, 2009, which is incorporated herein by reference. This application is related to co-pending U.S. application Ser. No. 12/783,762, filed on May 20, 2010.

BACKGROUND

Manufacturers, retailers, and sometimes third party promoters often offer discounts, incentives, and other price reductions to entice potential customers to purchase their products. These price reductions are often distributed on paper coupons that the customer must present at the point-of-sale location to redeem the value of the price reduction. Typically the final retail point-of-sale location is reimbursed for this price reduction by sending the redeemed paper coupon back to the provider that issued the paper coupon along with a record of the transaction for validation. This validation is often done by hand and may be conducted by a third party vendor who verifies that the paper coupon is valid, compares it to the record of the transaction, and then applies any relevant business rules. Not until the end of this tedious process does the retail point-of-sale location get reimbursed for the redeemed paper coupon. This is a time-consuming and expensive process that is prone to fraud and human error. Paper coupons are relatively easy to forge and the infrastructure required to process them is highly labor intensive.

There have been some attempts to provide price reductions in digital form. Some deliver the incentives to the customer in digital format but require the customer to present a printed coupon at the point-of-sale for redemption of the incentive which does nothing to address the reimbursement processing costs. Other systems require hardware connections which are expensive and impractical to implement. Some other systems require the use of mobile devices such as smart phones and personal digital assistants that store all of the customer's information. These systems are prone to loss and also exclude a large segment of the market that does not have such devices. What is presented is a system and method for issuance, redemption, and reimbursement of digital incentives that does not require paper coupons, does not require any additional hardware for implementation at the point-of-sale, and can digitally administer issuance, redemption, and reimbursement to reduce, if not eliminate, fraud in the process.

SUMMARY

A system and method for issuance, redemption, and reimbursement of digital incentives using existing retail infrastructure is presented. A central database connected to the internet enables customers to register unique customer registration information. The central database is able to store the unique customer registration information and assign unique identifiers to the unique customer registration information. The central database is also accessible to incentives providers through the internet to allow incentives providers to make available digital incentives.

Existing point-of-sale terminals are authenticated to have access to the central database. These point-of-sale terminals can be retail cash registers, internet check-out web pages, broadcast television signals, cable television signals, cellular telephones, or any other device or system that brokers a retail purchase transaction. These existing point existing point-of-sale terminals have payment devices and are connected to the internet. The payment devices can be a touch screen interface, a magnetic card reader, an infra-red scanner, an internet payment web page, or any other device or system that processes a customer payment. Each point-of-sale terminal is provided with a message broker that facilitates communication with the central database through the internet.

The customer redeems digital incentives at one of the authenticated existing point-of-sale terminals at the time of purchase by first presenting their unique identifier. The message broker routes the unique identifier to the central database. The message broker may also transmit the list of purchases made by the customer to the central database. The central database authenticates and validates the authenticated existing point-of-sale terminal, the customer's unique identifier, and the payment device. The central database then returns validated applicable digital incentives to the message broker. The message broker forwards the validated digital incentives to the authenticated existing point-of-sale terminal for redemption.

In some embodiments of the invention, the central database records each transaction and redemption of digital incentives and reports each successful redemption of a digital incentive to the incentives provider. In some embodiments the central database processes the value of the digital incentive plus any applicable transaction fees for reimbursement. In some embodiments, the central database communicates with a financial institution to process payment for reimbursement of redeemed digital incentives. The central database can also provide third party auditing of the digital incentives transaction;

In various embodiments of the invention, the customer can select digital incentives available to them by directly connecting to the central database from a personal computer, a personal digital assistant, a mobile telephone, a television, e-mail, or any other system or device that can connect to the internet. Alternatively, the customer can also select digital incentives directly from the incentives providers to be associated with their unique identifiers in the central database.

The digital incentives can also include business rules that must be met for redemption. In some embodiments, the central database can processes the business rules to validate the digital incentives. Since the business rules are maintained and processed externally, the rules are not constrained by the limited attributes that exist on bar codes. This invention allows marketers to apply business rules that have never been available to them before. Bar codes have restricted marketers to targeting by manufacturer code with a limited set of value codes. This invention allows marketers to combine unlimited rules such as time elements, location specific rules, unlimited UPC combinations, any value, historical shopping patterns, and many others.

The customer is informed of a successful redemption of digital incentives in various embodiments by any of SMS text message, e-mail, mail, telephone call, printed receipt from the authenticated existing point-of-sale terminals, or any other method or system available to the customer.

In various embodiments, the customer can present their unique identifier from a virtual smart card, a cellular phone, a magnetic strip on a swipe card, a bar code, biometrics information, a telephone number, an e-mail address, a pin number, an account number, or any other system or device that protects the customer unique identifier. The unique customer registration information can also include encrypted access codes for extra protection of confidential information. It is important to note that this invention is not dependent on any existing loyalty card based system. Other solutions in the market place simply integrate with existing loyalty systems like IBM's EME or NCR's Copient loyalty systems. This means that these solutions only work in grocery stores and only in stores that require customers to have a retail specific loyalty card. This invention allows any store in any industry to participate in processing digital incentives whether the customer has a loyalty card or not.

The authenticated point-of-sale terminals can be uniquely identified at the central server by initially registering an identifiable attribute with the central server. For additional protection, the central server can assign a matching encrypted public/private key pair to each authenticated point-of-sale terminals. This permits embodiments of the invention in which when a customer makes a purchase at one of the authenticated point-of-sale terminals and the customer provides their unique identifier, the identifiable attribute and the public/private key pair is transmitted to the central database through the internet along with the customer's unique identifier. The central database verifies the identifiable attribute, the public/private key pair, and the customer's unique identifier before returning applicable digital incentives for redemption by the customer.

Those skilled in the art will realize that this invention is capable of embodiments that are different from those shown and details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
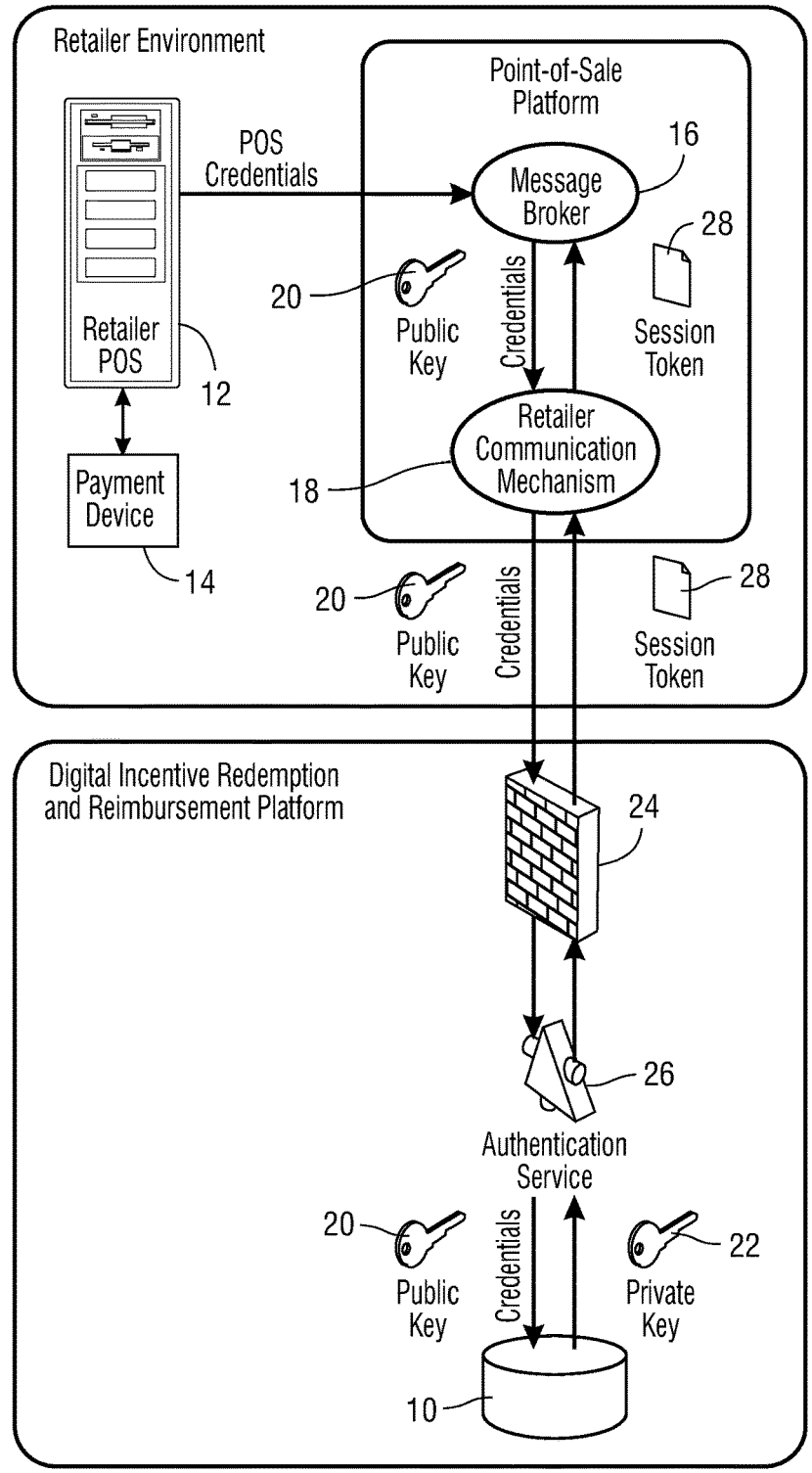
FIG. 1 is a flow chart depicting the initial authentication and registration of a point-of-sale terminal and a payment device with the central server.

Referring to the drawings, some of the reference numerals are used to designate the same or corresponding parts through several of the embodiments and figures shown and described. Variations of corresponding parts in form or function that are depicted in the figures are described. It will be understood that variations in the embodiments can generally be interchanged without deviating from the invention.

A big hurdle to successful implementation of a new technology is the startup and installation cost. Systems that require large initial investment in hardware that is incompatible with existing systems are not as easily adoptable as systems and methods that make use of existing equipment as much as possible. Typical retail environments, whether at a grocery store, a clothing store, or other brick and mortar retail outlets, have point-of-sale terminals where customers take their selections for purchase. These point-of-sale terminals are usually equipped with payment devices that allow the customer to use non-cash methods of payment. These payment devices are usually connected or connectable to the internet to establish secure connections to financial service providers to process payment and/or credit for the customer's purchases.

The same principle of a point-of-sale terminal and a payment device is also seen in internet retail applications. Customer selections on internet retail web sites are placed in "shopping carts" which act as point-of-sale terminals to aggregate and total the items to be purchased. Before purchases are finalized, the method of payment is usually processed with a payment device software that performs the same function as the brick-and-mortar equivalents but does not include a hardware component.

As the point-of-sale terminals and the payment devices are common to most retail establishments, the digital incentive issuance, redemption, and reimbursement system and method disclosed herein attempts to modify these items as little as possible to minimize implementation costs and increase participation. An example of a point-of-sale terminal that could be used in some of the embodiments disclosed herein is the IBM ACE POS manufactured by International Business Machines Corp. of Poughkeepsie, N.Y. Referring to FIG. 1, a central database 10 maintains a record of the all of the digital incentives transactions that are processed by the system and method. These are discussed in more detail below. The central database 10 is accessible on the internet to all authorized users. The central database 10 also maintains a record of retail locations that participate in the digital incentive program. For security purposes, retailers wishing to participate in the digital incentive program should ideally register authenticated existing point-of-sale terminals 12 with the central database 10, as presented in FIG. 1. For an additional layer of security, payment devices 14 associated with each authenticated existing point-of-sale terminal 12 can also be registered with the central database 10. These devices typically have unique identifiable attributes associated with them, such as serial numbers, Internet Protocol (IP) addresses, asset numbers, identification codes, or other manufacture specific identification information. The central database 10 maintains a record of the identifiable attribute of each authenticated existing point-of-sale terminal 12 and any associated payment devices 14. The central database 10 can be housed on a dedicated server but preferably cloud computing services can be used to reduce startup and maintenance costs. Examples of cloud computing service providers include Amazon Web Services provided by Amazon Web Services LLC, Google App Services provided by Google, Inc., and Azure Services Platform provided by Microsoft Corp.

Payment devices 14 are typically able to maintain secure connections to the internet. They are generally third party devices used for exchanging transactional payment information between point-of-sale terminals and financial institutions. The payment devices 14 are typically sold to retailer to provide a secure communication gateway and therefore payment devices 14 typically employ sophisticated encryption and secure network connections because of the sensitive nature of the information transmitted over them. These payment devices 14 are generally programmable with customizable software to enable retailers to tailor the functionality of the payment devices 14 as needed.

A piece of software called a message broker 16 manages communications from the authenticated existing point-of-sale terminal 12 to the central database 10. The message broker 16 may be loaded onto the payment device 14 or the point-of-sale terminal 12, but in any case is able to function as described. The message broker 16 packages and routes communications from the payment device 14 and/or the point-of-sale terminal 12 through the retailer's communication mechanism 18 to the central database 10. There are a variety of payment devices 14 in common use that can be programmed to include a message broker 16 as described herein, including touch screen interfaces, magnetic card readers, infra-red scanners, pin pads, and other devices. An example of a payment device 14 that can be used as a described herein is the 1000ES VeriFone PIN Terminal manufactured by VeriFone, Inc. of San Jose, Calif. The retailer's communication mechanism 18 may be a modem, a T-1 line, a telephone connection, a wireless communication system, or any other communication system that connects the message broker 16 to the central database 10.

Preferably, the central database 10 assigns a matching encrypted public/private key 20, 22 pair to each authenticated existing point-of-sale terminal 12. Any communications from the authenticated existing point-of-sale terminal 12 and any associated payment devices 14 to the central database 10 will be encrypted and include the public key 20. These messages can only be decrypted by the central database 10 which has the matching private key 22. Incoming messages to the central database 10 are first screened by a firewall 24 to block malicious software and then passed to an authentication service 26 that compares the public key 20 in the message with what is stored in the central database 10. The public key 20 matches the record of the location of the authenticated existing point-of-sale terminal 12 and the payment device 14 and if it passes, the central database 10 uses the private key 22 to decrypt the message for processing. The private key 22 is maintained solely on the central database 10. The message broker 16 includes the public key 20 in any transmission to the central database 10 for authentication, tracking, and auditing purposes. This adds a layer of security to ensure that transactions are from authenticated and authorized retailers. This reduces instances of fraud or theft.

A session token 28 is used to force the initial authentication and registration to time out after a short interval of time. Each initial authentication and registration process is assigned a session token 28 which is granted after all the credentials are authenticated. In the event of a security breach, the short life of the session token 28 reduces the chances of unauthorized initial authentication and registration from occurring. If an unauthorized person acquired a session token 28, unless they knew exactly what to do, what authentication credentials to use, and other specific information imbedded in the transaction, the unauthorized person would only have a few seconds to do anything before the session token 28 expires.

Transactions and redemptions that are carried out over authenticated point-of-sale terminals 12 and payment devices 14 may be catalogued and tracked on the central database 10 if required by the particular application.

It is important to note that the system and method is not dependent on any existing loyalty card based system. Other solutions in the market place simply integrate with existing loyalty systems like IBM's EME or NCR's Copient loyalty systems. This means that these solutions only work in grocery stores and only in stores that require customers to have a retail specific loyalty card. The invention disclosed herein allows any store in any industry to participate in processing digital incentives whether the customer has a loyalty card or not.

Figure 2:
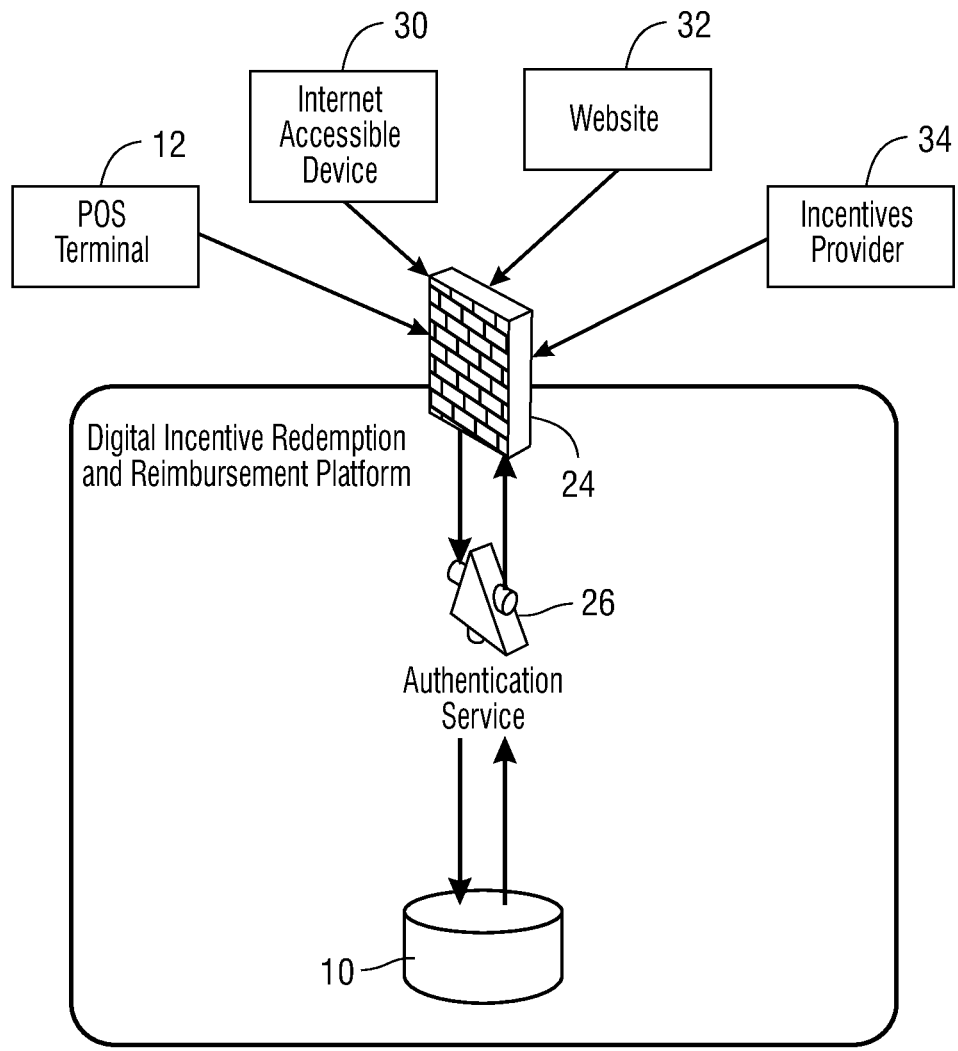
FIG. 2 is a flow chart showing initial registration of unique customer registration information with the central server.

FIG. 2 is a flowchart depicting several possible methods by which customers may begin to use the digital incentive system and method described herein. Customers can preferably register their participation in the digital incentive system and method by connecting to the central database 10 through any device that connects to the internet. This could be through a personal computer, a personal digital assistant, a mobile telephone, a television, e-mail, or other internet-accessible device 30. Alternatively the customer can be registered with the central database 10 through the retailer either by filling out an application form which the retailer will submit to the central database 10, through an authenticated existing point-of-sale terminal 12, or through the retailer's internet web site 32. Regardless of how it is done, the unique customer registration information is stored in central database 10 for each customer. The unique customer registration information can include the customer's name, mailing address, and contact information. For more targeted delivery of digital incentives, the central database 10 can also query demographic information and shopping preferences. Additional functionality can be included to store a customer's shopping list with periodic reminders sent to the customer of staple purchases. The central database 10 can also be programmed to prompt the customer if digital incentives are available for products in their shopping lists or alternatives to products they typically purchase. Other functionalities are obvious to those of skill in the art and are intended to be covered herein.

The central database 10 assigns a unique identifier to the unique customer registration information so that the digital incentive usage and other account information and statistics and be tracked and processed. The unique identifier can be a randomly generated password or pin number, or it could be selected by the customer, or it could be the customer's phone number, address, or other unique attribute, or it could incorporate biometrics such as retina scans or fingerprints. The unique identifier could be stored on a virtual smart card, a cellular phone, a magnetic strip on a swipe card, or a bar code. It could also be entered manually by the customer. The unique identifier associates the customer with their account in the central database 10. The customer needs to carry no information as all of their account information is held in the central database 10. Incentives providers 34 also have access to the central database 10. Incentives providers can be manufacturers, advertising agencies, service providers, grocery stores, retail outlets, financial institutions, or others that wish to provide digital incentives to customers registered with the central database 10. The incentives providers 34 supply the central database 10 with a listing of the incentives they wish to offer along with the business rules and limitations under which the incentives operate. Examples of incentives include: two-for-one offers, specific percentage or value discounts, etc. Since the business rules are maintained and processed on the central database 10, the business rules are not constrained by the limited attributes that exist on bar codes. The digital incentive system and method allows marketers to apply business rules that have never been available to them before. Bar codes have restricted marketers to targeting by manufacturer code with a limited set of value codes. The digital incentive system and method allows marketers to combine unlimited rules such as time elements, location specific rules, unlimited UPC combinations, any value, historical shopping patterns, and many others. Examples of business rules and limitations include: limits on the number of items purchased per customer, time limits on when the offer is valid, combinations of items that limit the incentive, geographic limitations by store, municipality, etc.

These digital incentives are made available to qualifying customers. It is important to note that this invention is not dependent on any existing loyalty card based system. Other solutions in the market place simply integrate with existing loyalty systems like IBM's EME or NCR's Copient loyalty systems. This means that these solutions only work in grocery stores and only in stores that require customers to have a retail specific loyalty card. This invention allows any store in any industry to participate in processing digital incentives whether the customer has a loyalty card or not.

While the assignment of digital incentives to the customer's account could be automatic, it is preferable from an advertising perspective that customers actually browse and select digital incentives that they wish to use. In this way customers can be exposed to new product offers and can be incentivized to purchase items they would otherwise not have purchased.

The central database 10 can include functionality that permits the customer to search for digital incentives for specific items and the central database 10 will present the closest matches to the search and possibly other related digital incentives. It can also include a matching feature such that a customer enters a shopping list of generic or branded items and the central database 10 will alert the customer to available digital incentives that fit the list. The customer can print the shopping list or have the list sent or e-mailed to a personal digital assistant, a cellular phone, or other device as a shopping aid. Additional functionality can be included such that a shopping list can be sent to a retail outlet to have the selected items available for pick up by the customer or delivery to an address specified by the customer. Specific Internet links can also be provided to enable customers to redeem their digital incentives on-line or to find out more information about a particular digital incentive. Many other variations in functionality will be obvious to those of skill in the art and such variations are intended to be covered herein.

Under this system and method, information about the incentives is processed in the central database 10 externally of the point-of-sale terminal 12. Therefore, as all of the information is processed in one central location are no issues with synchronization, timing, or having to ensure that all nodes in the system are updated and accurate. The system and method described herein avoids the situation in which each retail location must have a copy of all of the possible incentives, business rules, customer information, etc. as here the central database 10 stores all of that information regardless of the location of the point-of-sale terminal 12. Under this system and method, when a customer shops, the customer's incentive account is available instantly at every location that has access to the central database 10. A customer making selections of incentives automatically updates the central database 10 with those selections and those incentives are available to be redeemed at all available stores in real time. So long as a connection is available to the central database 10, a customer should be able to access their selected incentives from any authenticated point-of-sale terminal 12.

Figure 3:
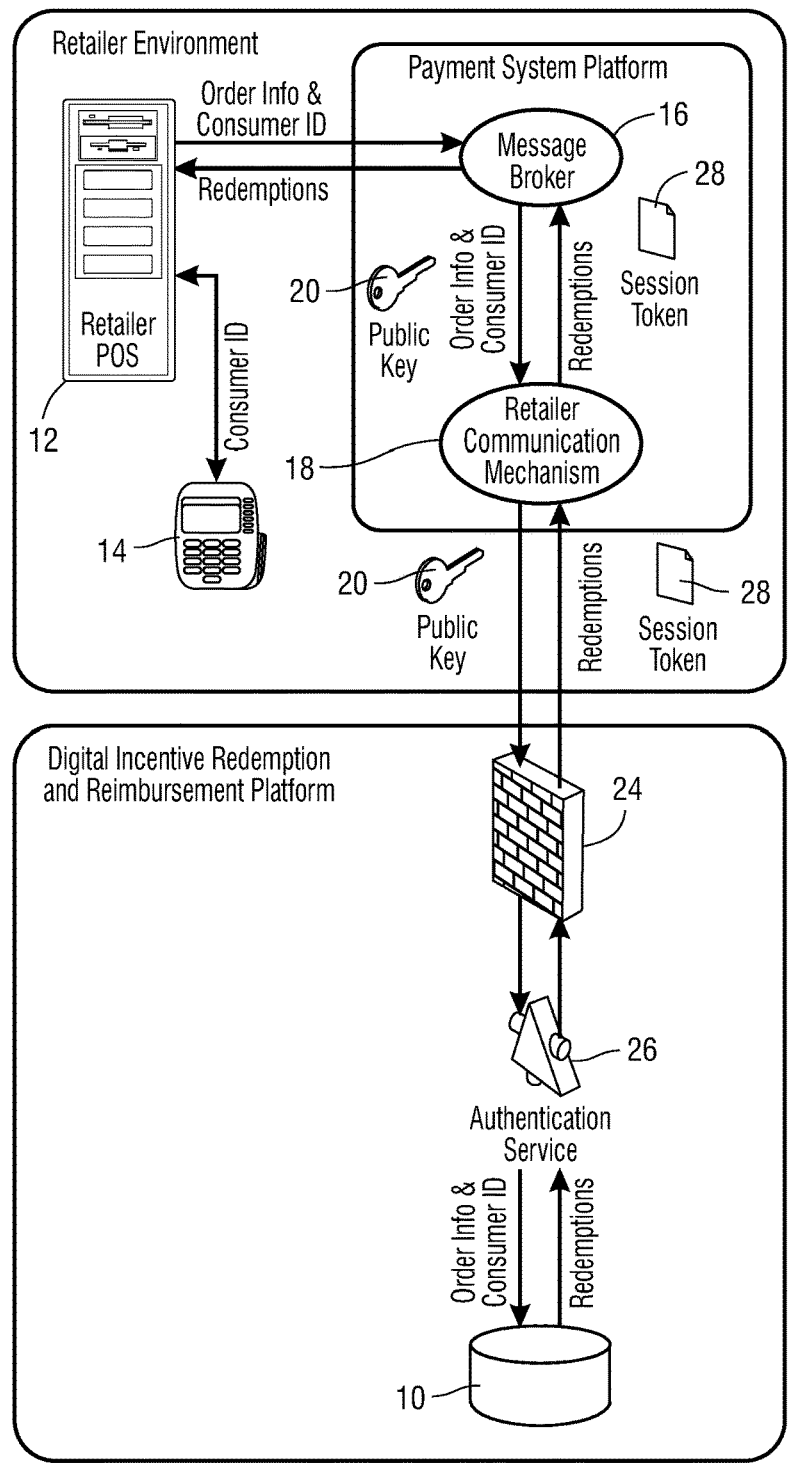
FIG. 3 is a flow chart showing a digital incentive redemption transaction.

FIG. 3 shows a flow chart of how digital incentives are redeemed when a customer makes a purchase at a retail location that has one of the previously authenticated point-of-sale terminals 12, a payment device 14, and the message broker 16 software. When the customer checks out to make payment for their purchases, the customer provides their unique identifier either personally, if the unique identifier is a pin number, a biometric, etc., or through a intermediary device if the unique identifier is stored on a virtual smart card, a cellular phone, a magnetic strip on a swipe card, or a bar code. A list of items to be purchased, the customer's unique identifier, the identifiable attributes of the authenticated existing point-of-sale terminal 12 and the payment device 14, and the public key 20 are compiled by the message broker 16 and transmitted to the central database 10 through the firewall 24 preferably through a secure communication channel.

The authentication service 26 compares the public key 20 in the message with what is stored in its records. The authentication service 26 checks to see if the public key 20 matches the record of the location of the authenticated existing point-of-sale terminal 12 and the payment device 14 and if it passes, the central database 10 creates a session token 28 to identify the transaction and establish a time limit on the processing of the digital incentives. The session token 28 is used to force a digital incentives redemption transaction to time out after a short interval of time. Each individual redemption process is assigned a session token 28 which is granted after all the credentials are authenticated. In the event of a security breach, the short life of the session token 28 reduces the chances of unauthorized redemptions from occurring, If an unauthorized person acquired a session token 28, unless they knew exactly what to do, what authentication credentials to use, what digital incentives to use, and other specific information imbedded in the transaction, the unauthorized person would only have a few seconds to do anything before the session token 28 expires.

The central database 10 uses the private key 22 to decrypt the message for processing. The central database 10 compares the list of items to be purchased with the digital incentives previously selected by the customer. Applicable business rules are imposed and the session token 28 is returned to the message broker 16 with the validated digital incentives. The message broker 16 routes the session token 28 with the validated digital incentives to the authenticated existing point-of-sale terminal 12 via the payment device 14 for redemption. Redemptions are displayed on the transaction receipt from the authenticated existing point-of-sale terminal 12. The session token 28 is continuously checked for expiration and if the transaction is terminated if it cannot be completed before the session token 28 expires. Optionally, a confirmation of the redemption is sent back to the central database 10. The central database 10 records the details of the transaction and redemption of the digital incentives with the customer's account. The customer can be sent a summary of the redemption of the digital incentives by SMS text message, e-mail, mail, telephone call, printed receipt from the authenticated existing point-of-sale terminals, or by any other appropriate notification.

Figure 4:
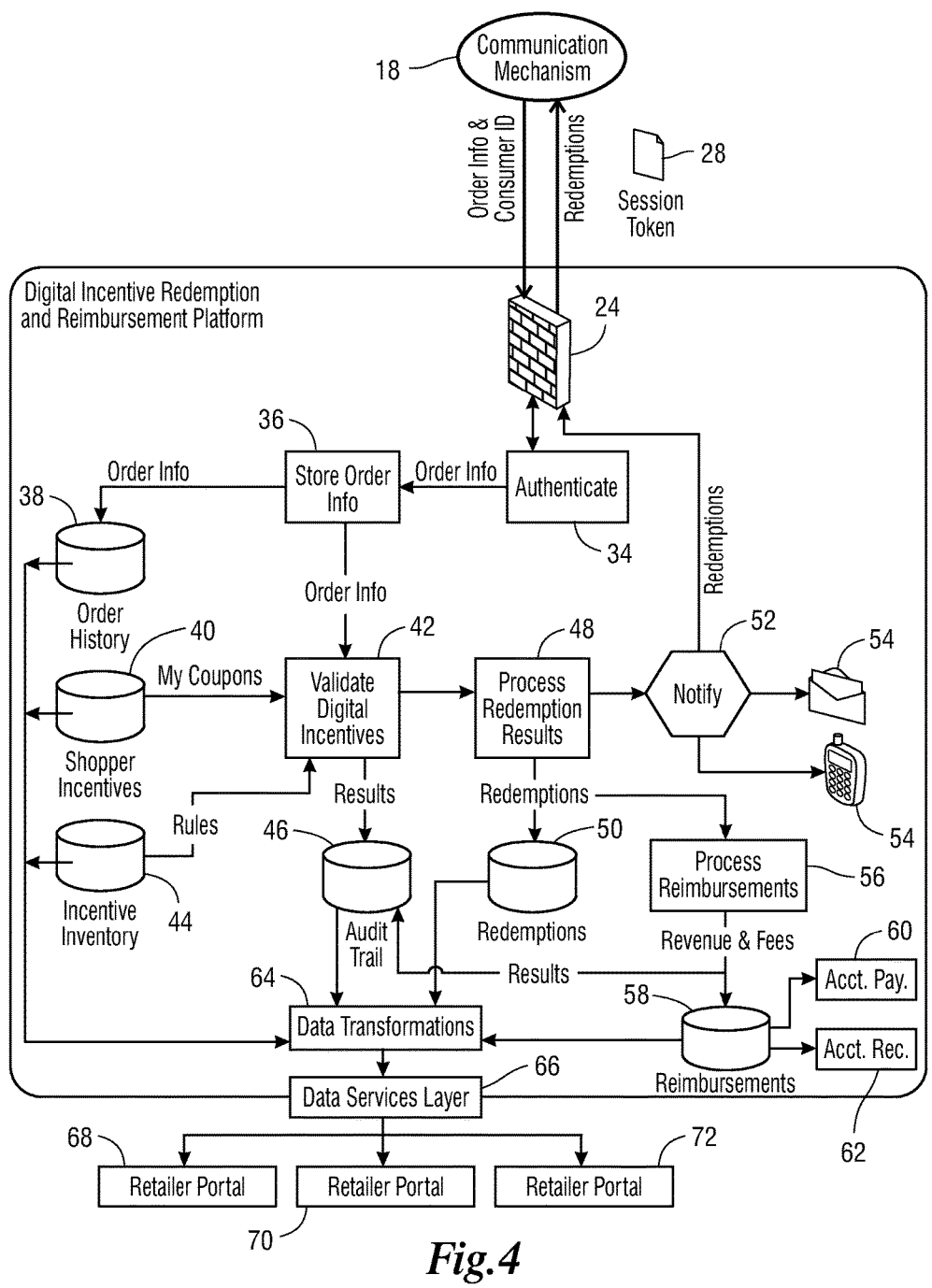
FIG. 4 is a flow chart showing the digital incentives redemption and reimbursement process.

On successful completion of the digital incentive redemption, the central database 10 processes the transaction for reimbursement. FIG. 4 shows the reimbursement process in more detail. As can be best understood by comparing FIGS. 3 and 4, when the central database 10 receives a request to validate a customer and process digital incentives, the central database 10 first authenticates 34 the authenticated existing point-of-sale terminal 12, the payment device 14, and the customer unique identifier. The customer's list of items to be purchased is compared 36 to the customer's account order history 38. Available digital incentives 40 are validated 42 against the customer's list of items and the relevant business rules are applied 44. The results of this transaction can be recorded 46 for later auditing purposes. The applicable digital incentives are processed 48 and the redemption can be recorded 50 for later auditing purposes. The validated proceeded digital incentives are returned to the message broker 16 and the customer is notified 52 by any appropriate method 54 as discussed above.

After successful redemption of the digital incentives, the central database 10 processes reimbursements 56. This could be conducted in real time as the digital incentives are reimbursed or it could be aggregated at periodic intervals, after specified threshold values are redeemed, or otherwise as determined by the particular business model. Records of the reimbursements can be made 46 for later auditing purposes. The reimbursement process 58 determines the cost of the digital incentive based on the applicable business rules and records the amount of money that is owed to the redeemer of the digital incentive by the incentives provider. The incentives provider can also be charged a transaction fee. The total due is sent to the incentives provider's accounts receivable 62. The reimbursement process 58 also accumulates any fees that are owed for the issuance, redemption, and reimbursement transactions and these fees are sent to accounts payable 62. The central database 10 can be configured to communicate directly with a financial institution to process payment for reimbursement of redeemed digital incentives. Preferably, all of the issuance, redemption, and reimbursement transaction data is aggregated and collated 64. A data services layer 66 can make this data available in real time and any billing or payables can be electronically transmitted to the customers 68, retailers 70, and/or incentives providers 72 on any interval necessary. These portals 68, 70, 72 have appropriate filters to limit the viewing of any sensitive information to the appropriate viewers.

As already discussed, the point-of-sale terminals that can be authenticated to apply the systems and method disclosed herein are not limited to retail cash registers and internet check-out web pages. Any device that can connect to the internet and communicate with the central database 10 can be used as well. For example cable and broadcast television signals combined with internet communications can be used to log a user into the central database 10 and process purchases through a television remote control. Other devices and combinations will be obvious to those of skill in the art and are intended to be covered herein.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. A method for issuance, redemption, and reimbursement of digital incentives comprising:

adding a message broker to cooperate with a given existing point-of-sale (POS) terminal in a retail environment to provide compatibility with a central database, the given existing POS terminal being of a given type from among a plurality of different types of POS terminals associated with a plurality of different retailers and each communicatively coupled to the central database, the given existing POS terminal having an identifiable attribute associated therewith, the message broker operating independently from the plurality of different types of POS terminals and independently from a respective loyalty program associated with the plurality of different retailers;

storing in the central database that is connected to a communications network a unique customer identifier in association with each of a plurality of customers;

storing in the central database information about a plurality of digital incentives each associated with a respective unique customer identifier;

storing in the central database information about the given existing POS terminal;

receiving, via the message broker via the communications network, a given unique customer identifier associated with a customer that has selected one or more items for purchase;

obtaining, via the message broker from the given existing POS terminal during a purchase transaction, information identifying the one or more items selected for purchase by the customer associated with the given unique customer identifier;

transmitting, via the message broker, to the central database the given unique customer identifier and the information identifying the items that the customer has selected for purchase;

authenticating, via the central database, the given existing POS terminal based upon the associated identifiable attribute;

assigning, via the central database, a matching encrypted public/private key pair to the authenticated given existing POS terminal and communicating the public key to the authenticated existing POS terminal so that communications with the central database are encrypted;

encrypting, via the message broker, the information identifying the one or more items selected for purchase, the associated given unique customer identifier, and the identifiable attribute of the authenticated given existing POS terminal;

communicating, via the message broker, the encrypted information identifying the one or more items selected for purchase, the encrypted associated given unique customer identifier, the encrypted identifiable attribute of the authenticated given existing POS terminal, and the public key, to the central database;

comparing, at the central database, the public key received from the message broker to the public key assigned at the central database;

generating a unique session token associated with the purchase transaction, the unique session token having a session token expiration associated therewith;

decrypting, based upon the private key and at the central database, the encrypted associated unique customer identifier, and the encrypted identifiable attribute of the authenticated given existing POS terminal;

identifying, via the central database, at least one digital incentive from among the plurality thereof that is associated with the given unique customer identifier and that is applicable to the one or more items selected for purchase, the at least one identified digital incentive having a digital incentive expiration associated therewith corresponding to the session token expiration;

communicating, via the central database, to the message broker, the unique session token and the at least one identified digital incentive, and determining whether the unique session token has expired based upon the session token expiration, and if not, applying the at least one identified digital incentive to the purchase transaction for redemption at the authenticated given existing POS terminal as the at least one identified digital incentive has not expired, and if so, not applying the at least one identified digital incentive as the at least one identified digital incentive has also expired.

2. The method of claim 1, wherein the central database is accessible to one or more computers, each of which is associated with a digital incentives provider, via the communications network, the method further comprising allowing digital incentives providers to make available, via the central database, the plurality of digital incentives to customers.

3. The method of claim 1, further comprising:
storing, in the central database, information about the at least one digital incentive that was redeemed at each of the plurality of different types of POS terminals;
transmitting, via the central database, information about the at least one digital incentive that was redeemed to a computer associated with respective incentives providers; and
facilitating, via the central database, reimbursement of the plurality of different retailers for the at least one digital incentive that was redeemed in an amount equal to a value of the at least one digital incentive plus any applicable transaction fees.

4. The method of claim 1, further comprising auditing, via the central database, redemption of the at least one digital incentive by the authenticated given existing POS terminal.

5. The method of claim 1, further comprising:
storing, in the central database, information about the at least one digital incentive that was redeemed at the authenticated given existing POS terminal; and
transmitting, via the central database, information about the at least one digital incentive that was redeemed to a corresponding computer associated with a corresponding incentive provider associated with the at least one digital incentive that was redeemed for reimbursement.

6. The method of claim 1, further comprising:
associating, in the central database, each of the plurality of digital incentives with one or more business rules to be met for redemption;
storing, in the central database, the one or more business rules; and
applying, via the central database, the one or more business rules to determine the identified at least one digital incentive that is applicable to the one or more items selected for purchase by the customer.

7. The method of claim 6, wherein the one or more business rules are not constrained to attributes provided by a bar code.

8. The method of claim 1, further comprising transmitting information about a redemption of the at least one identified digital incentive to the customer by SMS text message, e-mail, mail, telephone call, or a printed receipt from the given existing POS terminal.

9. The method of claim 1, wherein the given unique customer identifier is received by the message broker via a virtual smart card, a cellular phone, a magnetic strip on a swipe card, a bar code, biometrics information, a telephone number, an e-mail address, a pin number, an RFID tag, or an account number.

10. The method of claim 1, further comprising allowing the at least one digital incentive to be selectable by the customer by accessing the central database using a personal computer, a personal digital assistant, a mobile telephone, a television, e-mail, or mail.

11. The method of claim 1, further comprising associating the authenticated given existing POS terminal with a payment device, and wherein the payment device comprises a touch screen interface, a magnetic card reader, an infra-red scanner, or an internet payment web page.

12. The method of claim 1, further comprising communicating, via the central database, with a financial institution to process payment for reimbursement of redeemed digital incentives.

13. The method of claim 1, wherein the authenticated given existing POS terminal comprises a retail cash register, an internet check-out web page embodied on a computer, a broadcast television signal embodied on a set-top box, a cable television signal embodied on a set-top box, or a cellular telephone.

14. The method of claim 1, further comprising transmitting, via the message broker, information to the central database confirming redemption of the at least one digital incentive.

* * * * *